United States Patent
Reynolds et al.

(10) Patent No.: US 9,584,059 B2
(45) Date of Patent: Feb. 28, 2017

(54) MOTOR CONTROL SYSTEM AND INTERFACE

(71) Applicant: Allegro Microsystems, LLC, Worcester, MA (US)

(72) Inventors: Timothy Reynolds, Westborough, MA (US); Dennis Hwang, Gyeonggi-do (KR); Walter Kim, Kyunggi-do (KR); Thomas Rowan, Holden, MA (US)

(73) Assignee: Allegro Microsystems, LLC, Worcester, MA (US)

( * ) Notice: Subject to any disclaimer, the term of this patent is extended or adjusted under 35 U.S.C. 154(b) by 30 days.

(21) Appl. No.: 14/307,207

(22) Filed: Jun. 17, 2014

(65) Prior Publication Data

US 2015/0365041 A1  Dec. 17, 2015

(51) Int. Cl.
*H02P 6/08* (2016.01)
*H02P 29/00* (2016.01)

(52) U.S. Cl.
CPC ............... *H02P 29/00* (2013.01); *H02P 6/08* (2013.01)

(58) Field of Classification Search
CPC . H02P 21/0039; H02P 21/145; H02P 2207/01
USPC ............ 318/490, 400.21, 280, 373, 696
See application file for complete search history.

(56) References Cited

U.S. PATENT DOCUMENTS

| | | | | |
|---|---|---|---|---|
| 4,639,798 A * | 1/1987 | Harrison | ............... | G11B 5/5521 360/73.03 |
| 6,060,848 A * | 5/2000 | Alvaro | ................... | H02H 7/093 318/400.06 |
| 7,227,329 B1 * | 6/2007 | Sheu | ...................... | G05B 19/19 318/602 |
| 2002/0060544 A1 * | 5/2002 | Teutsch | ................... | H02P 6/085 318/599 |
| 2010/0188032 A1 * | 7/2010 | Takai | ........................ | H02P 6/08 318/400.21 |
| 2011/0090775 A1 * | 4/2011 | Miyagoe | ............... | G11B 5/5582 369/47.38 |
| 2013/0063069 A1 * | 3/2013 | Ko | .......................... | H02P 6/085 318/722 |
| 2015/0188465 A1 * | 7/2015 | Soh | ......................... | H02P 6/182 318/400.35 |

OTHER PUBLICATIONS

Allegro Data Sheet A4945 and A4949; "Three Phase Sensorless Sinusoidal Fan Driver," May 2014; 11 pages.
Data Sheet; Three Phase Sensorless Sinusoidal Fan Driver; Allegro Microsystems; dated May 6, 2014; 11 pages.

* cited by examiner

*Primary Examiner* — Shawki S Ismail
*Assistant Examiner* — Muhammad S Islam
(74) *Attorney, Agent, or Firm* — Daly, Crowley, Mofford & Durkee, LLP

(57) ABSTRACT

A motor control system is presented. The motor control system includes a motor controller and a motor driver. The motor controller and motor driver are coupled by an interface which includes a conductor configured to carry both a motor speed control signal from the motor controller to the motor driver and a motor feedback signal from the motor driver to the motor controller. The motor controller provides a motor speed control signal to the motor driver and the motor driver provides a motor feedback signal to the motor controller.

8 Claims, 4 Drawing Sheets

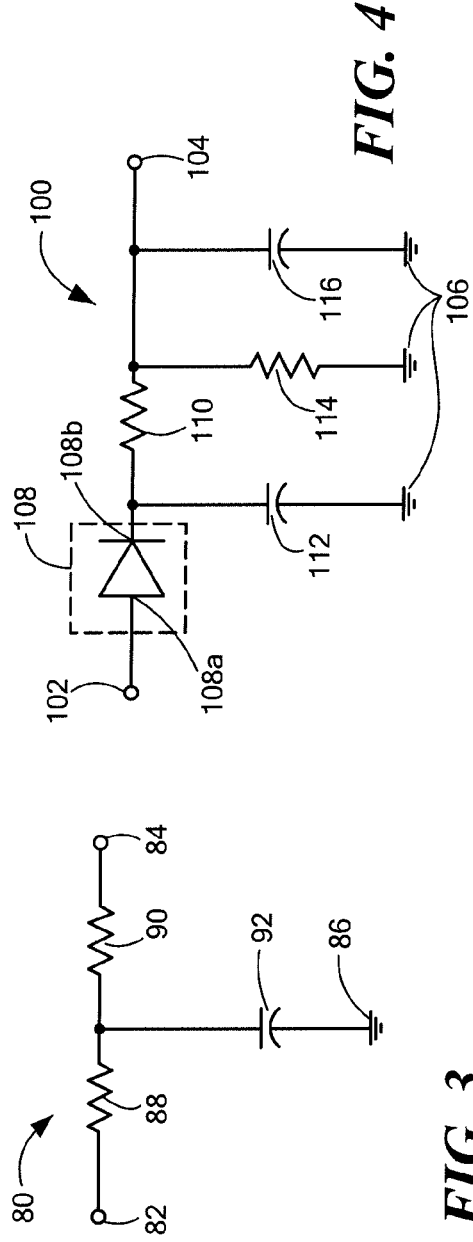
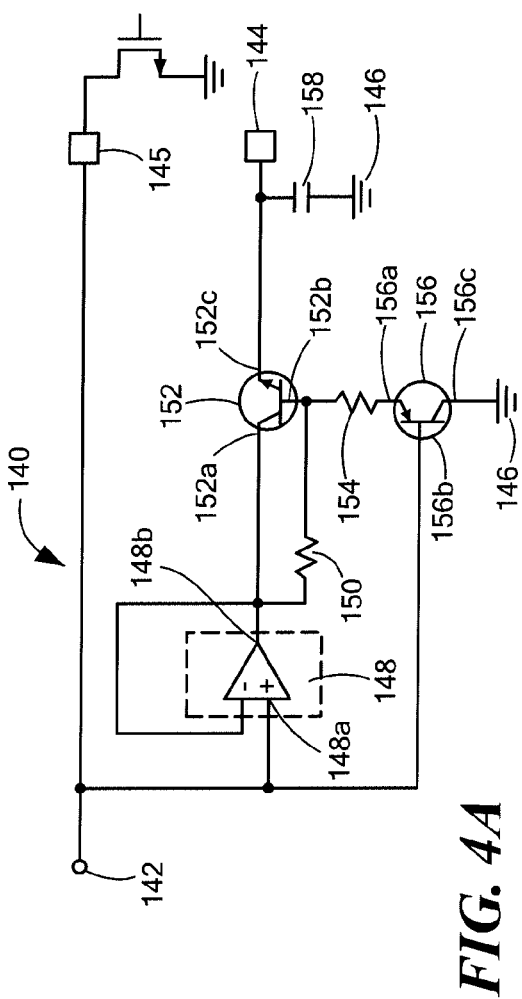
FIG. 3
FIG. 4
FIG. 4A

MOTOR CONTROL SYSTEM AND INTERFACE

CROSS REFERENCE TO RELATED APPLICATIONS

Not applicable.

STATEMENT REGARDING FEDERALLY SPONSORED RESEARCH

Not Applicable.

FIELD OF THE INVENTION

This invention relates generally to electronic motor control circuits and methods and, more particularly, to such circuits and methods that respond to an external motor speed control signal without requiring an additional, dedicated connection.

BACKGROUND OF THE INVENTION

Circuits to control and drive motors, such as brushless DC (BLDC) motors, are known. Some motor driver circuits control the motor speed by providing a variable motor supply voltage that is generated by a variable motor supply voltage circuit based in part on a motor feedback signal. This speed control scheme has the advantage of not requiring a dedicated motor speed control input to the driver circuit, since the only connections required are the supply voltage, ground, and feedback signal connections. However, the motor speed range and efficiency can suffer with this three-wire scheme.

Alternatively, some motor driver circuits respond to an external speed control signal, such as a Pulse Width Modulation (PWM) signal. While this type of motor driver circuit can provide an extended speed range for the motor, an additional connection is required to accommodate the speed control signal.

SUMMARY OF THE INVENTION

In one aspect, an interface between a motor controller and a motor driver includes a conductor coupled between the motor controller and motor driver that is configured to carry both a speed control signal to the driver and a motor feedback signal to the controller. Embodiments of the invention may include one or more of the following features. The interface may include a digital-to-analog converter (DAC) and a peak detector. The DAC may have an input terminal coupled to receive a PWM motor speed control signal from a speed control terminal of a motor controller and an output terminal. The peak detector may have an input terminal coupled to the DAC output terminal and an output terminal coupled to the speed command input terminal of the motor driver.

In another aspect, a motor control system includes a motor driver and an interface. The motor driver may include a speed sensing circuit and a motor control logic circuit. The speed sensing circuit may be coupled to a motor and configured to generate a motor feedback signal indicative of rotational speed of the motor for coupling to the motor controller. The motor control logic circuit may be responsive to an analog motor control signal and generate signals to drive the motor. The interface is coupled between a motor controller and the motor driver and may include a conductor configured to carry both a speed control signal to the driver and a motor feedback signal to the controller. The interface may further include a DAC and a peak detector. The DAC may be responsive to a motor speed control from the motor controller and may generate an analog motor speed control signal for coupling to the peak detector. The peak detector may be responsive to the analog motor speed control signal for generating an analog motor speed command signal for coupling to the motor driver.

BRIEF DESCRIPTION OF THE DRAWINGS

The foregoing features of the invention, as well as the invention itself may be more fully understood from the following detailed description of the drawings, in which:

FIG. 3 is a schematic of an illustrative digital-to-analog converter for use in the motor control system of FIG. 1;

FIGS. 4 and 4A are schematics of illustrative peak detectors for use in the motor control system of FIG. 1.

DETAILED DESCRIPTION OF THE INVENTION

Before describing the present invention, some introductory concepts and terminology are explained. As used herein, the terms "voltage level" and "signal level" mean the voltage magnitude of the respective DC signal. The terms "discontinuous signal" and "discontinuous analog signal" both mean an analog signal generally having a non-zero voltage level wherein the signal voltage level may drop to zero in a near instant and subsequently jump back to the non-zero voltage level. The term "desired speed" means the speed at which a motor controller instructs a motor driver to operate motor. The term "average pulse width" means the average pulse width within a pulse width modulated signal taken over a constant time period.

Figure 1:
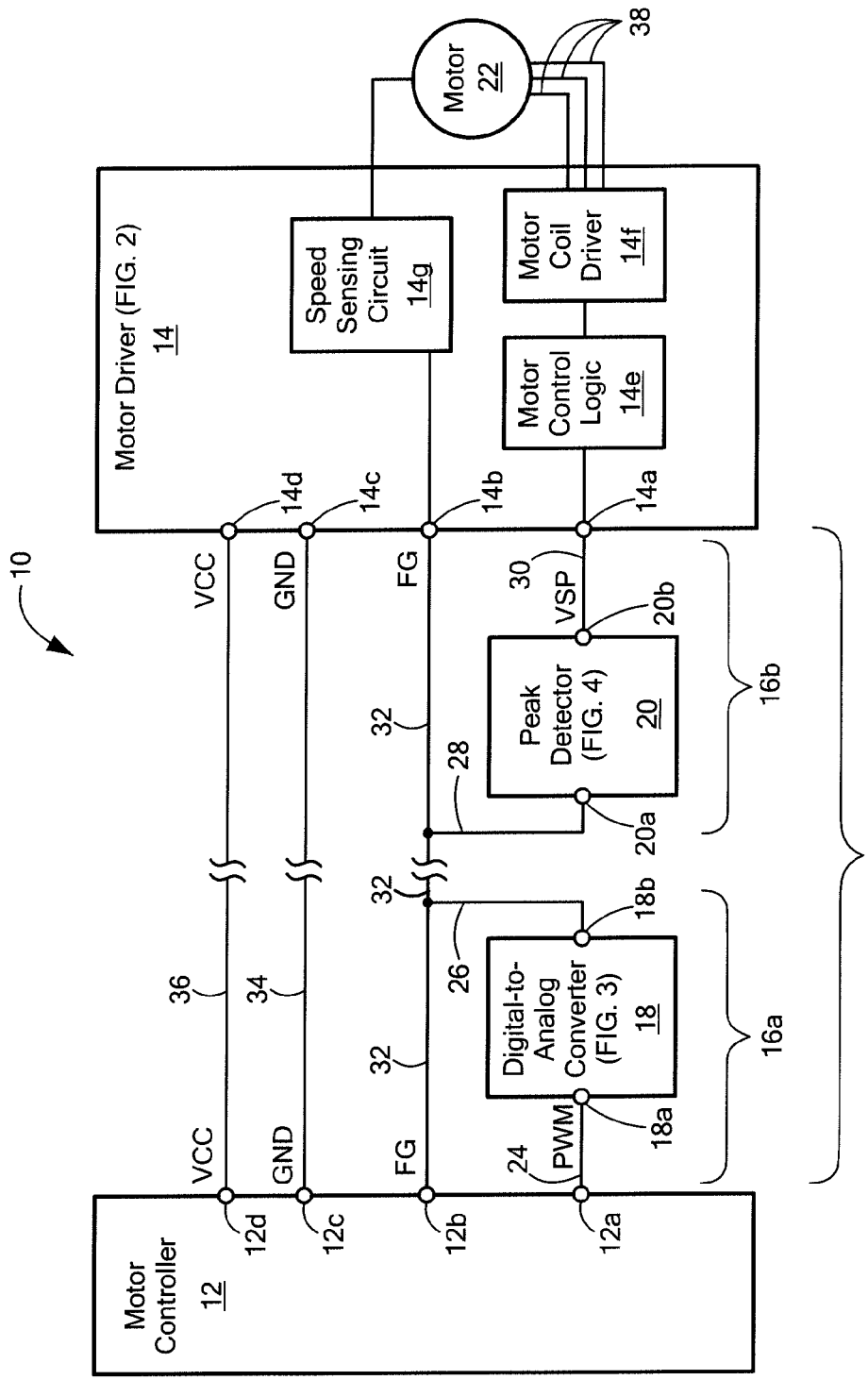
FIG. 1 is a block diagram of a motor control system.

FIG. 1 shows a motor control system 10 for controlling a motor 22. The control system 10 includes a motor controller 12, a motor driver 14, and an interface 16. The motor controller 12 includes a motor speed control output terminal 12a, motor speed feedback input terminal 12b, ground terminal 12c, and supply voltage terminal 12d. The motor driver 14 includes a motor speed command input terminal 14a, a motor speed feedback output terminal 14b, a ground terminal 14c, and a supply voltage terminal 14d. The ground terminals 12c, 14c of the motor controller 12 and the motor driver 14 are coupled together through a conductor 34 and the supply voltage terminals 12d, 14d of the motor controller 12 and the motor driver 14 are coupled together through a conductor 36, as shown.

The motor driver 14 will be described in greater detail in connection with FIG. 2 below. Suffice it to say here that the driver 14 includes a motor control logic circuit 14e that is responsive to a motor speed command signal carried by a conductor 30 and a motor coil driver circuit 14f that is coupled to the motor control logic circuit 14e. For simplicity of explanation, reference characters pointing to electrical connections or conductors may be may be used interchangeably to refer to the signal(s) carried by the respective conductor(s) and/or to the conductor(s) themselves.

The motor coil driver circuit 14f may be a circuit configured to drive motor 22 by energizing and providing power to the coils of the motor. In some embodiments, the motor coil driver 14*f* may be in the form of an H-bridge and the motor control logic circuit 14*e* may control switching of the transistors within the H-bridge so as to energize and de-energize the motor coils. By energizing and de-energizing the magnetic coils of motor 22 in various patterns and sequences, the motor control logic circuit may cause motor 22 to start, stop, accelerate, decelerate, and/or change directions.

The motor connection 38 between motor driver 14 and motor 22 may be a three-wire connection, as shown. Motor connection 38 may also take other forms including, but not limited to, a four-wire, five-wire, six-wire, eight-wire, or other connection type. The motor connection 38 may be a single phase, double phase, three-phase, four-phase, or any other type of interface depending upon the type of motor.

The motor driver 14 further includes a speed sensing circuit 14*g* that may include a magnetic field sensor, which may detect the position and/or speed of motor 22 and provide a motor speed feedback signal (FG) on conductor 32 representative of the position and/or speed of motor. To this end, the sensing circuit 14*g* may include a Hall-effect sensor comprising one or more Hall-effect elements, a magnetoresistive sensor comprising one or more magnetoresistive elements, a giant-magnetoresistive sensor comprising one or more giant-magnetoresistive elements, a back-EMF sensor to detect back-EMF signals from motor 22, etc. In some embodiments that may be referred to as "sensorless," the back-EMF of the spinning motor, which may have a magnitude that is directly proportional to the speed of the motor, can be measured without the need for an external sensor. For example, in three phase sensorless systems, the back-EMF zero voltage crossing is detected by the motor driver and used to commutate the motor and also used to create a speed signal.

Different types of Hall effect elements can also be used to measure position and speed of the motor. These Hall effect elements include, for example, a planar Hall element, a vertical Hall element, and a circular vertical hall (CVH) element. As is also known, there are different types of magnetoresistance elements, for example, a semiconductor magnetoresistance element such as Indium Antimonide (InSb), a giant magnetoresistance (GMR) element, an anisotropic magnetoresistance element (AMR), a tunneling magnetoresistance (TMR) element, and a magnetic tunnel junction (MTJ). The magnetic field sensing element may be a single element or, alternatively, may include two or more magnetic field sensing elements arranged in various configurations, e.g., a half bridge or full (Wheatstone) bridge. Depending on the device type and other application requirements, the magnetic field sensing element may be a device made of a type IV semiconductor material such as Silicon (Si) or Germanium (Ge), or a type III-V semiconductor material like Gallium-Arsenide (GaAs) or an Indium compound, e.g., Indium-Antimonide (InSb), or another compound semiconductor material InGaAsP, or high mobility material, for example GaN.

Interface 16 is coupled between the controller 12 and the driver 14 and includes two parts: a control part 16*a* and a driving part 16*b*. The interface control part 16*a* is coupled between the motor speed control output terminal 12*a* of the controller 12 and conductor 32 and may be provided in the form of a digital-to-analog converter (DAC) 18, as shown. More particularly and as will be described further, the DAC 18 may be responsive to a motor speed control signal on a conductor 24 from the controller 12 and may provide an analog motor speed control signal on a conductor 26.

The interface driving part 16*b* is coupled between the speed command input terminal 14*a* of the driver 14 and conductor 32 and may be provided in the form of a peak detector 20. More particularly and as will be described further, the peak detector 20 may be responsive to the analog motor speed control signal on conductor 28 and may generate a continuous motor speed control signal on conductor 30, which is coupled to the motor driver 14.

The DAC 18 and the peak detector 20 are coupled together by conductors 26, 28, and 32. Conductor 32 is further coupled between the speed feedback output terminal 14*b* of the driver 14 and the speed feedback input terminal 12*b* of the controller 12, as shown. With this arrangement, the conductor 32 is configured to carry both the motor speed control signal 24 from the controller 12 to the driver 14 (or more specifically from the DAC 18 to the peak conductor 20) and also the FG motor speed feedback signal 32 from the driver to the controller. Since the motor speed control and the motor speed feedback signal share a common conductor 32, the need for an additional connection between the controller and the driver is eliminated.

In the illustrative embodiment, the motor speed control signal 24 provided by the controller 12 is in the form of a Pulse Width Modulation (PWM) signal having a duty cycle representing the desired motor speed. The DAC 18 receives the PWM speed control signal 24 from motor controller 12 and converts the PWM speed control signal to an analog speed control voltage signal 26.

The motor driver 14 provides the FG motor feedback signal 32 at motor feedback output terminal 14*b*. The FG motor feedback signal 32, which may be a digital pulse train, is used to encode the rotational speed (i.e., the velocity) of the motor 22. In some embodiments, the FG motor feedback signal is a PWM signal having an average pulse width indicative of the motor speed.

Since conductor 32 carries both the FG motor feedback signal 32 and the analog speed control signal 26, these signals are effectively combined to form a combined motor control/feedback signal, here labeled 28, although it will be appreciated that the combined signal appears on all coupled conductors. As described further below in conjunction with FIG. 5, the combined motor control/feedback signal 28 is produced by the FG motor feedback signal 32 pulling the analog motor speed control signal 26 down to ground at a duty cycle indicative of the motor speed. Thus, the combined motor control/feedback signal 28 is a discontinuous analog signal which contains both motor speed command information by its amplitude and motor speed feedback information by its duty cycle.

The peak detector 20 is provided to eliminate discontinuities in the combined motor control/feedback signal 28. As described below in more detail in conjunction with FIGS. 4 and 4A, the peak detector 20 holds the analog speed control voltage level even when the FG motor feedback signal 32 is at ground. Thus, the peak detector 20 receives the discontinuous combined motor control/feedback signal 28 and provides a continuous analog motor speed command signal 30 to motor driver 14.

The motor driver 14 or portions thereof may be implemented in the form of an Integrated Circuit (IC). The DAC 18 and/or the peak detector 20 may also be implemented in the form of an integrated circuit. In some embodiments, the motor driver 14 and the peak detector 20 may be implemented on the same IC. In some embodiments, the controller 12 or portions thereof may be implemented in the form of discrete components on a circuit board, which may include software and/or firmware. In some embodiments, the motor controller 12 and the peak detector 20 may be implemented on the same circuit board.

Figure 2:
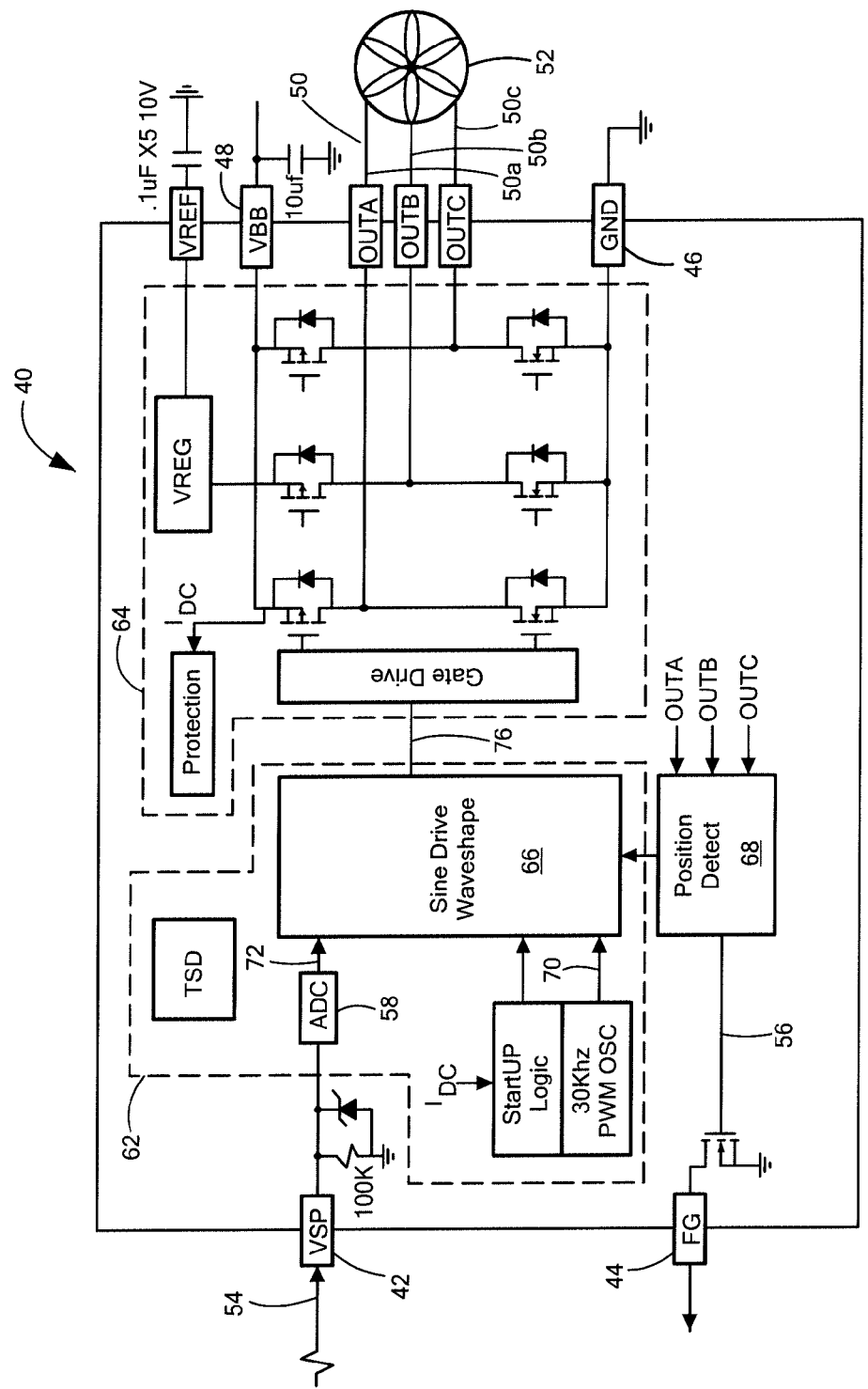
FIG. 2 is a block diagram of an illustrative motor driver for use in the motor control system of FIG. 1.

Referring to FIG. 2, an illustrative motor driver 40 for use in the motor control system 10 of FIG. 1 is shown. Motor driver 40 includes a motor speed command input terminal 42, a motor feedback output terminal 44, a ground terminal 46, and a supply voltage terminal 48. It will be appreciated that terminals 42, 44, 46, and 48 may correspond respectively to terminals 14a, 14b, 14c, and 14d in FIG. 1. Motor driver 40 also provides motor connection 50 which is shown coupled to a motor 52. The motor 52 may be a 3-phase BLDC motor and the motor connection 50 may be a 3-wire connection, as illustrated by connections 50a, 50b, and 50c. It should be appreciated that the motor driver 40 and motor 52 shown in FIG. 2 are merely illustrative and that the motor control interface disclosed herein is not limited to systems using 3-phase BLDC motors or 3-phase motor drivers.

The motor driver 40 includes a motor control logic circuit 62 that may be the same as or similar to the motor control logic circuit 14e of FIG. 1. The motor control logic circuit 62 is coupled to the analog speed command input terminal 42. The motor control logic circuit 62 includes an Analog-to-Digital Converter (ADC) 58 and a sine drive waveshape circuit 66. It should be understood that other waveshape circuits can be used within the illustrative motor driver 40, such as trapezoidal waveshape circuits. The motor driver 40 also includes a motor coil driver circuit 64 which may be the same as or similar to the motor coil driver 14f of FIG. 1 and which is coupled to the motor connection 50. The motor driver 40 further includes a motor speed and/or position sensing circuit 68 coupled to the motor feedback output terminal 44.

The motor control logic circuit 62 responds to an analog speed command signal 54 that may be the same as or similar to the analog speed command signal 30 of FIG. 1. The ADC 58 converts the analog speed command signal 54 into a digital demand signal 72. In some embodiments the digital demand signal is a 9-bit signal. The sine drive waveshape circuit 66 produces a modulation profile signal 76 by applying an oscillator signal 70 to the digital demand signal 72. The modulation profile signal 76 is coupled to the motor coil driver circuit 64. The motor coil driver circuit 64 may convert the modulation profile signal 76 into three motor driver signals, 50a-c, having 120-degree phase separation, for coupling to the motor 52.

In the illustrative embodiment, the speed sensing circuit 68 is responsive to the motor driver signals 50a-c to detect the position and/or speed of the motor 52 and produces a FG motor feedback signal 56 that may be the same as or similar to the speed feedback signal 32 of FIG. 1. It will be appreciated however that other circuits and techniques for detecting motor speed and/or position, for example including the use of magnetic field sensors, are possible.

Referring to FIG. 3, an illustrative DAC 80 for use in the motor control system 10 of FIG. 1 is shown. The DAC 80 has an input terminal 82, an output terminal 84, and a ground terminal 86. It should be appreciated that, in the circuits shown in FIG. 3 and also in FIGS. 4 and 4A, the input terminal and output terminal designations are arbitrary and are designated herein as such merely for convenience of explanation. Input terminal 82 may be the same as or similar to DAC input terminal 18a of FIG. 1 and may receive a PWM motor speed control signal, like signal 24 in FIG. 1. Output terminal 84 may be the same as or similar to DAC output terminal 18b of FIG. 1 and may provide an analog motor speed control signal, like signal 26 in FIG. 1.

The illustrative DAC 80 includes a first resistor 88 coupled to input terminal 82, a second resistor 90 coupled to output terminal 84 and to first resistor 88, and a capacitor 92 coupled between the node interconnecting resistors 88 and 90 and a ground terminal 86 as shown. The resistors 88 and 90 can have any resistance value and the capacitor 92 can have any capacitance value, although those skilled in the art will appreciate that higher component values will generally result in more stable operation and increased response time.

It will be appreciated that the DAC 80 functions as a low-pass analog filter. When provided with a PWM signal at input terminal 82, the DAC 80 provides an analog signal at output terminal 84 having voltage proportional to the average input signal pulse width. Thus, referring back to FIG. 1, DAC 80 may be used in motor control system 10 to convert the PWM motor speed control signal 24 having an average pulse width proportional to the desired motor speed into analog motor speed control signal 26 having level proportional to the desired motor speed. The operation of DAC 80 is further illustrated by FIGS. 5A and 5B, which show exemplary DAC 80 input and output signals respectively. It will be appreciated that other forms and configurations of DACs are possible for use in the system of FIG. 1. Moreover, it should be understood that the second resistor 90 is not strictly needed to perform a DAC function and, within the system 10 (FIG. 1), the second resistor 90 is used to interface the DAC 80 with the motor speed feedback input terminal 12b of the motor controller. Thus, the second resistor 90 can be eliminated without change the function of the DAC 80 as a low-pass filter.

Referring to FIG. 4, an illustrative peak detector 100 for use in the motor control system 10 of FIG. 1 is shown. The peak detector 100 has an input terminal 102, an output terminal 104, and ground terminal 106. Input terminal 102 may be the same as or similar to peak detector input terminal 20a of FIG. 1 and may receive a discontinuous analog signal, such as combined motor speed control/feedback signal 28 shown in FIG. 1. Output terminal 104 may be the same as or similar to peak detector output terminal 20b in FIG. 1 and may provide a continuous analog signal, such as analog motor speed command signal 30 of FIG. 1.

The illustrative peak detector 100 includes a diode 108 having an anode terminal 108a coupled to the input terminal 102 and a cathode terminal 108b coupled to a first resistor 110 and to a first capacitor 112, which capacitor is further coupled to ground terminal 106, as shown. The first resistor 110 is further coupled to a second resistor 114, a second capacitor 116, and output terminal 104, as shown. Resistor 114 and capacitor 116 are further coupled to ground terminal 106, as shown. The resistance and capacitance values of the components 110-116 may be selected based upon the voltage drop of the diode 108 and the desired response time.

It will be appreciated that the circuit shown for peak detector 100 functions as a simple "sample and hold" circuit. Peak detector 100 may receive a discontinuous analog signal on input terminal 102 and provide a continuous analog signal on output terminal 104 by charging capacitors 112, 116 to the peak voltage level of the input signal. Thus, referring back to FIG. 1, peak detector 100 may receive the discontinuous combined motor control/feedback signal 28 on input terminal 102 and provide continuous analog motor speed command signal 30 on output terminal 104. The operation of peak detector 100 is further illustrated by FIGS. 5B and 5C, which show exemplary peak detector 100 input and output signals respectively. It will be appreciated that other forms and configurations of peak detector, or sample and hold circuits, are possible for use in the system of FIG. 1.

FIG. 4A shows an alternative peak detector 140 that can be used within the motor control system 10 of FIG. 1. The peak detector 140 has an input terminal 142, an output terminal 144, and ground terminals 146. Input terminal 142 may be the same as or similar to peak detector input terminal 20*a* of FIG. 1 and may receive a discontinuous analog signal, such as combined motor speed control/feedback signal 28 shown in FIG. 1. Output terminal 144 may be the same as or similar to peak detector output terminal 20*b* in FIG. 1 and may provide a continuous analog signal, such as analog motor speed command signal 30 of FIG. 1. Also shown is a third terminal 145, which may be coupled to the motor speed feedback output terminal 14*b* shown in FIG. 1.

The illustrative peak detector 140 includes a negative feedback amplifier 148 having a positive input terminal 148*a* coupled to the input terminal 142 and an output terminal 148*b* coupled to a first resistor 152 and to a collector terminal 152*a* of a first transistor 152. The first resistor 152 is also coupled to a base terminal 152*b* of the first transistor and to a second resistor 154, which second resistor is coupled to a collector terminal 156*a* of a second transistor 156. The second transistor 156 further includes a base terminal 156*b* coupled to the input terminal 142 and an emitter terminal 156*c* coupled to a ground terminal 146. The first transistor 152 further includes an emitter terminal 152*c* coupled to the output terminal 144 and to a capacitor 158, which capacitor is coupled to a ground terminal 146, as shown.

Figures 5A, 5B, 5C:
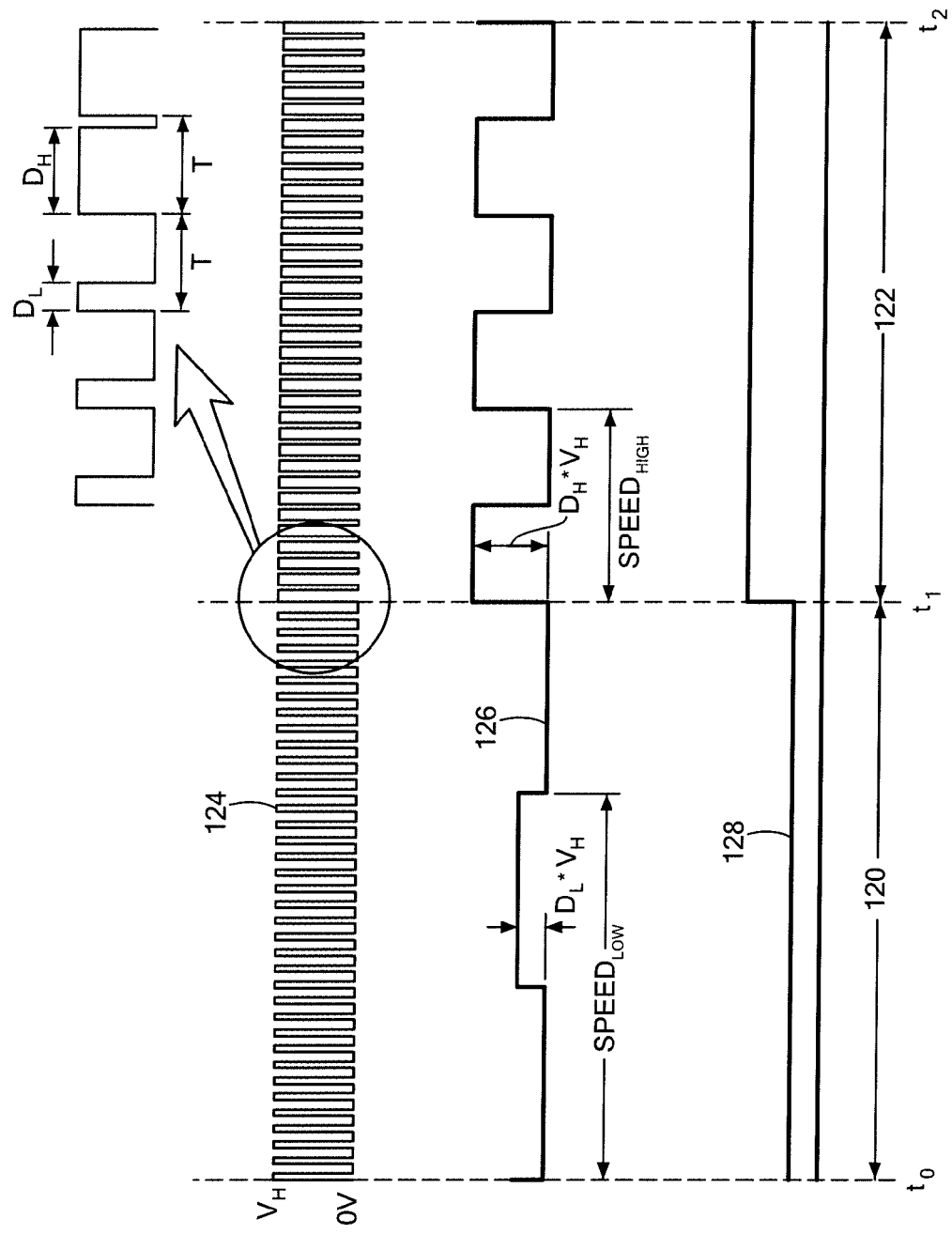
FIGS. 5A-5C show illustrative waveforms associated with the motor control system of FIG. 1.

Referring to FIGS. 5A-5C, illustrative waveforms associated with the motor control system 10 of FIG. 1 are shown. It should be appreciated that in each of FIGS. 5A-5C, the horizontal axis represents time increasing from left to right. Additionally, in each of FIGS. 5A-5C, the vertical axis represents a signal level, increasing from bottom to top. The waveforms shown in FIGS. 5A-5C collectively illustrate operation of the motor control system 10 (FIG. 1) during two consecutive periods of time: a first time period 120 beginning at time $t_0$ and ending at time $t_1$, and a second time period 122 beginning at time $t_1$ and ending at time $t_2$. In this illustration, the motor controller 12 (FIG. 1) is commanding a motor to operate at a first speed ("low") during the first time period 120 and then at a second relatively higher speed ("high") during the second time period 122. It should be appreciated that neither the time periods shown nor the respective waveforms shown in FIGS. 5A-5C are intended to indicate any limitation of the invention and are provided merely for illustrative purposes.

FIG. 5A shows an illustrative PWM motor speed control signal 124 which may correspond to a signal carried on conductor 24 of FIG. 1. In the modulation scheme shown, the pulse widths are proportional to the desired motor speed. Thus, the narrow pulses (i.e., pulses having width $D_L$) within the first time period 120 indicate, on average, a first desired motor speed and the wider pulses (i.e., pulses having width $D_H$) within the second time period 122 indicate, on average, the second desired motor speed. Although the pulse widths are shown to be proportional to the desired motor speed, the system is not limited as such and, for example, the pulse widths could be inversely proportional or otherwise related to the desired motor speed.

FIG. 5B shows an illustrative combined signal 126 which may correspond to a signal carried on conductors 26, 28, and 32 of FIG. 1. The combined signal 126 comprises a square wave which encodes information about both the commanded motor speed command and the sensed motor speed (i.e. motor feedback information). The motor speed command information is encoded as the average maximum amplitude of the square wave 126 over a given time period. By function of the DAC 18 (FIG. 1), the maximum amplitude of the combined signal 126 over a given time period corresponds to the average pulse width of the PWM motor speed control signal 124 (FIG. 5A) during generally the same period of time. For example, during the first time period 120, the motor speed control signal 124 has an average pulse width of $D_L$ and the combined signal 126 has an average maximum amplitude of $D_L*V_H$ (where $V_H$ is an arbitrary constant voltage level). Likewise, during the second time period 122, the motor speed control signal 124 has an average pulse width of $D_H$ and the combined signal 126 has an average maximum amplitude of $D_H*V_L$.

The combined signal 126 also includes motor speed feedback information, which is encoded as the square wave peak-to-peak distance. The speed sensing circuit 14*g* (FIG. 1) outputs switches between low and high based on the sensed motor speed. In one embodiment, the speed sensing circuit 14*g* switches between high and low once per electrical revolution of the motor. Thus, the motor speed can be determined based upon the peak-to-peak distance of the combined signal 126. In the illustration of FIG. 5B, the longer peak-to-peak distance (i.e., "$SPEED_{LOW}$") during the first time period 120 indicates the motor is rotating at a relatively low speed, and the shorter peak-to-peak distance (i.e., "$SPEED_{HIGH}$") indicates the motor is rotating at a relatively high speed.

FIG. 5C shows an illustrative analog motor speed command signal 128 which may correspond to a signal on conductor 30 of FIG. 1 and, thus, may be provided at the output of peak detector 20 in response to the combined signal 126 (FIG. 5B). As can be seen, the peak detector operates to "extract" the motor speed command information from the combined signal 126 (FIG. 5B). The resulting command signal 128 provides a generally constant voltage value that is proportional to the desired motor speed during a given time period. For example, during the first time period 120, the command signal 128 has a relatively low constant voltage, whereas during the second time period 122, the command signal 128 has a relatively high constant voltage, consistent with the PWM motor speed control signal 124 of FIG. 5A during generally the same time periods.

The motor driver 14 (FIG. 1) receives the continuous analog motor speed command signal 128 at the motor speed command input terminal 14*a* (FIG. 1). It will be appreciated that although the motor speed command signal 128 is provided by peak detector 20 (FIG. 1) in response to the combined signal 126, the amplitude of signal 128 is proportional (and may be equal to) to that of the analog motor speed control signal 26 (FIG. 1) and thus, no motor speed command information has been lost by using the combined conductor 32 (FIG. 1). Having described preferred embodiments of the invention it will now become apparent to those of ordinary skill in the art that other embodiments incorporating these concepts may be used.

Accordingly, it is submitted that that the invention should not be limited to the described embodiments but rather should be limited only by the spirit and scope of the appended claims. All publications and references cited herein are expressly incorporated herein by reference in their entirety.

What is claimed is:

1. A motor control system for use with a controller having a speed control output terminal and a speed feedback input terminal, the motor controller to provide a pulse-width modulated (PWM) motor speed control signal at the speed control output terminal, the motor control system comprising:
- a motor driver comprising:
  - a speed sensing circuit having a speed feedback output terminal and configured to generate a speed feedback signal indicative of a rotational speed of a motor; and
  - a motor control logic circuit coupled to the motor and having a speed command input terminal, the motor control logic circuit responsive to a motor speed control signal provided at the speed command input terminal to control the speed of the motor; and
- an interface coupled between the motor driver and the controller comprising:
  - a digital-to-analog converter having an input terminal coupled to the controller speed control output terminal and an output terminal, the digital-to-analog converter responsive to the PWM motor speed control signal at the input terminal to provide an analog motor speed control signal at the output terminal;
  - a peak detector having an input terminal and an output terminal coupled to the motor control logic circuit speed command input terminal; and
  - a common conductor coupled to the motor control logic circuit speed command input terminal, the controller speed feedback input terminal, the digital-to-analog converter output terminal, and the peak detector input terminal, wherein the common conductor carries a combined signal, the combined signal comprising a square wave having an amplitude responsive to the analog speed control signal and a peak-to-peak distance responsive to the speed feedback signal,
  - wherein the peak detector is configured to extract the analog motor speed command signal from the combined signal and to provide the extracted analog motor speed command signal to the motor control logic circuit via the peak detector output terminal.

2. The motor control system of claim 1 wherein at least one of the digital-to-analog converter or the peak detector is implemented on an integrated circuit.

3. The motor control system of claim 1 wherein the speed feedback signal is a PWM signal having an average pulse width indicative of a rotational speed of the motor.

4. The motor control system of claim 2 wherein the motor driver and at least one of the digital-to-analog converter or the peak detector are implemented on the same integrated circuit.

5. The motor control system of claim 2 wherein the controller and at least one of the digital-to-analog converter or the peak detector are implemented on the same circuit board.

6. A method for use within a motor control system including a controller having a speed control output terminal and a speed feedback input terminal, the motor controller to provide a pulse-width modulated (PWM) motor speed control signal at the speed control output terminal, the method comprising:
- receiving the PWM motor speed control signal from the motor controller speed control output terminal;
- generating, using a digital-to-analog converter having an input terminal coupled to the controller speed control output terminal and an output terminal, an analog speed control signal in response to the PWM motor speed control signal;
- generating a speed feedback signal indicative of a rotational speed of a motor;
- generating a combined signal comprising a square wave having an amplitude responsive to the analog speed control signal and a peak-to-peak distance responsive to the speed feedback signal;
- providing the combined signal to the motor controller speed feedback input terminal via a common conductor coupled to a motor control logic circuit speed command input terminal, the controller speed feedback input terminal, the digital-to-analog converter output terminal, and a peak detector input terminal;
- extracting, using the peak detector having an input terminal and an output terminal coupled to the motor control logic circuit speed command input terminal, the analog motor speed command signal from the combined signal; and
- providing the extracted analog motor speed command signal to the motor control logic circuit to control the speed of the motor.

7. The method of claim 6 wherein the speed feedback signal is a PWM signal having an average pulse width indicative of a rotational speed of the motor.

8. The method of claim 6 wherein the combined signal is a discontinuous analog signal produced by pulling the analog motor speed control signal to ground at a duty cycle determined by the speed feedback signal.

* * * * *

UNITED STATES PATENT AND TRADEMARK OFFICE
CERTIFICATE OF CORRECTION

PATENT NO. : 9,584,059 B2
APPLICATION NO. : 14/307207
DATED : February 28, 2017
INVENTOR(S) : Timothy Reynolds et al.

It is certified that error appears in the above-identified patent and that said Letters Patent is hereby corrected as shown below:

In the Specification

Column 2, Line 63, delete "may be may be used" and replace with --may be used--

Column 6, Lines 19-20, delete "having level proportional to" and replace with --having a level proportional to--

Column 6, Line 30, delete "without change the function" and replace with --without changing the function--

Column 8, Line 59, delete "that that the" and replace with --that the--

Signed and Sealed this
Sixth Day of March, 2018

Andrei Iancu
*Director of the United States Patent and Trademark Office*